US005997242A

United States Patent [19]
Hecker et al.

[11] Patent Number: 5,997,242
[45] Date of Patent: Dec. 7, 1999

[54] HYDRAULIC TURBINE

[75] Inventors: George E. Hecker, Worcester; Willem Jansen, Weston, both of Mass.

[73] Assignees: Alden Research Laboratory, Inc., Holden; Northern Research & Engineering Corp, Woburn, both of Mass.

[21] Appl. No.: 08/971,435

[22] Filed: Nov. 17, 1997

Related U.S. Application Data

[60] Provisional application No. 60/032,185, Dec. 2, 1996, provisional application No. 60/036,856, Jan. 31, 1997, and provisional application No. 60/054,843, Aug. 5, 1997.

[51] Int. Cl.⁶ .................................................. F04D 3/02
[52] U.S. Cl. ......................... 415/72; 415/219.1; 416/177
[58] Field of Search .................... 415/72, 75, 74, 415/219.1; 416/188, 177, 176, 223 K, 223 A

[56] References Cited

U.S. PATENT DOCUMENTS

| | | |
|---|---|---|
| 2,997,345 | 8/1961 | Stahle . |
| 3,156,190 | 11/1964 | Stahle . |
| 3,606,567 | 9/1971 | Stahle . |
| 3,708,239 | 1/1973 | Stahle . |
| 3,958,723 | 5/1976 | Stahle . |
| 4,111,599 | 9/1978 | Stahle . |
| 4,143,999 | 3/1979 | Ryall .......................................... 415/72 |
| 4,193,737 | 3/1980 | Lemmon ................................... 415/73 |
| 4,218,175 | 8/1980 | Carpenter . |
| 4,347,035 | 8/1982 | Stahle . |
| 4,349,322 | 9/1982 | Stahle . |
| 4,496,282 | 1/1985 | Gokhman ................................ 415/161 |
| 4,540,334 | 9/1985 | Stahle . |
| 5,139,391 | 8/1992 | Carrouset, II . |
| 5,441,384 | 8/1995 | Gokhman ................................ 415/161 |

FOREIGN PATENT DOCUMENTS

| | | |
|---|---|---|
| 0 334 737 | 9/1989 | European Pat. Off. . |
| 4320180 A1 | 12/1993 | Germany . |
| 248 305 | 4/1947 | Switzerland . |
| 216 428 | 6/1924 | United Kingdom . |
| 2026092 | 1/1980 | United Kingdom . |
| WO 95/02768 | 1/1995 | WIPO . |

*Primary Examiner*—Edward K. Look
*Assistant Examiner*—Richard Woo
*Attorney, Agent, or Firm*—Michael M. Gnibus

[57] ABSTRACT

An hydraulic turbine includes a rotatable turbine runner. The turbine runner has a circumferential inlet for receiving a fluid and an axial outlet for discharging the fluid. The turbine runner also includes a conical-shaped hub rotatable about a central axis, the hub having a diameter that decreases in size from the inlet to the outlet, the conical-shaped hub including a base having a circumference adjacent the inlet and a surface sloping inwardly toward the central axis, the surface including a concave section facing the inlet when viewed in the meridional cross-section. The turbine runner also includes at least two helical turbine blades connected to the conical-shaped hub, each turbine blade having a leading edge adjacent to the inlet, a trailing edge adjacent to the outlet, a blade running length therebetween having a pitch, each turbine blade further including an outer edge, wherein each turbine blade winds at least halfway around the conical-shaped hub. The turbine runner also includes a shroud surface surrounding the rotatable hub, the shroud surface being defined by the outer edges of the turbine blades, the shroud surface and the hub defining a flow channel for the fluid between the inlet and the outlet. The circumferential inlet completely surrounds the base of the hub and is adapted for receiving a fluid flow around the circumference of the inlet that is uniform in quantity, direction and pressure, the fluid flow including a component perpendicular to the central axis when viewed in the meridional cross-section. The hub surface and the shroud surface are both non-parallel to the central axis at the inlet and parallel to the central axis at the outlet for changing the direction of the fluid passing through the turbine runner. The fluid is discharged from the turbine runner outlet in a direction that is substantially parallel to the central axis.

55 Claims, 7 Drawing Sheets

HYDRAULIC TURBINE

This application claims benefit of Provisional Applns. 60/032,185 filed Dec. 2, 1996; 60/036,856 filed Jan. 31, 1997, and 60/054,843 filed Aug. 5, 1997.

BACKGROUND OF THE INVENTION

The invention relates generally to turbine runners and to turbines incorporating such turbine runners, which are well suited for use as hydraulic turbines for hydroelectric power generation.

The hydraulic turbine is an element of turbomachinery that efficiently converts hydraulic energy into mechanical energy. Hydraulic turbines are included in river dams to generate hydroelectric power.

There are a number of types of conventional turbine wheels, or runners that are utilized in turbines for hydroelectric power generation. Two examples of conventional hydraulic turbine runners that are well known to one skilled in the art, are the Francis and Kaplan turbines which are illustrated schematically in FIGS. 1 and 2 respectively. It should be understood that the discrete turbine blades, runner hub, and other elements of the Francis and Kaplan turbines illustrated in FIGS. 1 and 2 are in the same dimensional relationships and proportions as in well known conventional Francis or Kaplan turbines.

The Francis turbine identified at 10 in FIG. 1, is housed in a scroll case 12, and is characterized by a large number of relatively short, discrete blades 14 spaced circumferentially around the turbine hub. The blades convert hydraulic energy to mechanical energy in a relatively short axial length identified as L in FIG. 1. The axial length L represents the axial distance between the uppermost portion of the blade leading edge 16 and the lowermost tip of the trailing blade edge 18. The blades have a leading edge 16 with a leading edge length, LE, and a trailing edge 18. The maximum diameter of the Francis turbine identified as, D, in FIG. 1 is twice the radial distance between the outermost portion of a blade and the center of rotation of the turbine runner. The axial length L is typically about ⅓ of the maximum diameter D.

Fluid flows through the Francis turbine in the direction of arrows 20 and passes from the blade leading edge 16 to the blade trailing edge 18 of the blades 14.

Turning to FIG. 2, Kaplan turbines are propeller-type turbines in which the positions of the runner blades are adjustable. The conventional Kaplan turbine, identified generally at 30 is substantially enclosed by scroll case 32. The Kaplan turbine includes a plurality of blades 34 each having a leading edge 36 and a trailing edge 38. Like the Francis turbine, the Kaplan turbine has an axial blade length, L, equal to the distance between the uppermost portion of the leading blade edge 36 and the lowermost tip of the trailing blade edge 38; a maximum diameter D equal to twice the lateral distance between the axis of rotation and the outermost blade edge; and a leading edge length LE. In the Kaplan turbine shown in FIG. 2, the axial length L is about ¼ of the maximum diameter D.

Some of the significant physical attributes and dimensional relationships associated with the Francis and Kaplan turbines illustrated in FIGS. 1 and 2 are; A) in both the Kaplan and Francis turbines, the ratio equal to L/D is less than 0.6; and B) both turbine runners have a significant number of blades each with leading edge lengths LE, such that the ratio of the sum of the lengths of the leading edges, ΣLE, to the maximum diameter, D, for both turbine runners is equal to or greater than 1. For example, both the Kaplan and Francis turbines have at least four blades and the Francis turbine may have as many as 15 blades.

It should be understood that the foregoing general physical attributes and dimensional relationships associated with the Francis and Kaplan turbines also exist in other conventional turbine runners. The Kaplan and Francis turbines are used herein to highlight generally the foregoing physical attributes and dimensional relationships in conventional turbine runners, because of the relative familiarity of the Francis and Kaplan turbines to one skilled in the art.

The Francis and Kaplan turbines are frequently utilized to generate power in hydroelectric power stations which are typically located along a river. The Francis and Kaplan turbines are located in river power houses, and the river water passes downstream through them, thereby generating the required hydroelectric power.

Use of conventional turbine runners in river power houses has resulted in a certain mortality of fish that travel along rivers and through the river dams. The mortality of the fish traveling through conventional turbines is a result of any one or a combination of the following: internal injuries produced by sudden pressure reductions; the effects of cavitation; injuries from shear due to the presence of velocity gradients; and trauma resulting from contact between the fish and the turbine runner or other turbine component parts.

Contact injury to fish is also the result of leading edge blade strike. Turbine characteristics which may be related to contact injury are flow velocity relative to the blades, the number of blades, the shape of the flow passage, and the spacing of the blades. The relatively large number of blades and total length of the leading edges of the blades (ΣLE) associated with the Kaplan and Francis turbines and other conventional turbines may contributes to fish mortality as a result of contact between the leading blade edges and the fish. Abrasion damage to fish results from fish being drawn into narrow gaps between turbine blades and other turbine components.

High velocity zones or high velocity gradients (shear) exist at the gaps between rotating and stationary components. Such high velocity shear zones are formed for example, between the blade edges and the throat ring (see item 100 in FIG. 2). The high velocity gradients in the Francis and Kaplan turbines are related to the small axial distance, L, between the leading and trailing edges of the blades.

Cavitation occurs when the local pressure is low enough to cause water vapor bubbles to form, and the downstream implosion of these bubbles occurs when the pressure is sufficiently increased. The implosion produces pressure waves of instantaneous high pressure which are believed to cause fish injury. Conditions which may affect cavitation include: 1) general or local low pressure zones; 2) high velocity zones; 3) abrupt changes in flow direction; 4) surface roughness of the runner and blades; and 5) the air content of the water.

Pressure damage results from rapid decreases in the pressures to which fish have become acclimated. The relatively small ratio of axial length, L, to maximum diameter, D, and the short distance between the leading and trailing edges of the blades in known turbines contributes to fish mortality caused by sudden pressure reductions.

Shear injury to fish passing through a turbine occurs in the zones between streams of water having different velocities. Fish are injured when different parts of their bodies are subjected to different velocities and drag forces.

Existing hydraulic turbines used for hydroelectric power generation have been designed with little regard to their effect on fish which may pass through the turbine. The result is fish mortality in many installations. This is particularly a problem on some rivers where there are a series of hydroelectric facilities along the river and the cumulative fish mortality rate is higher.

The foregoing illustrates limitations known to exist in present hydraulic turbine runners and the turbines in which they are used. Thus, it is apparent that it would be advantageous to provide a hydraulic turbine runner that decreases fish mortality. Accordingly, a suitable alternative hydraulic turbine runner is provided, including features more fully disclosed hereinafter.

SUMMARY

In accordance with a first aspect, a turbine runner allows fish to pass through more safely and reduces fish mortality. The turbine runner includes at least two turbine runner blades included in a corkscrew configuration. Significantly, the corkscrew blades are exceptionally long in the overall direction of fluid flow through the turbine. In accordance with preferred embodiments, fluid flow to the runner from the inlet is mixed flow (as described further below); and fluid flow at the outlet is directed substantially longitudinally. In certain highly preferred embodiments of the turbine runner: the ratio of the sum of the leading edge lengths to the runner diameter is less than 1.0, the ratio of each blade length to the runner diameter is greater than 1.0, the ratio of each blade length to the respective blade width is greater than 3.0, the ratio of the axial length to the runner diameter is greater than 0.6, and the turbine runner (at its best efficiency point): is at least 80% efficient and achieves a rate of pressure change less than 80 psi/second along substantially the entire length of the runner blades, and the minimum absolute pressure maintained along the main fluid flow path is 4 psia when the trailing edges are located at a tailwater elevation.

In accordance with another aspect, turbines are provided for hydraulic power generation and other applications incorporating a turbine runner as disclosed above. Additional applications for the turbine wheels and turbines disclosed here will be apparent to those skilled in the art in view of this disclosure and the more detailed description of certain preferred embodiments provided below.

DESCRIPTION OF THE DRAWING FIGURES

DESCRIPTION OF CERTAIN PREFERRED EMBODIMENTS

Figure 1:
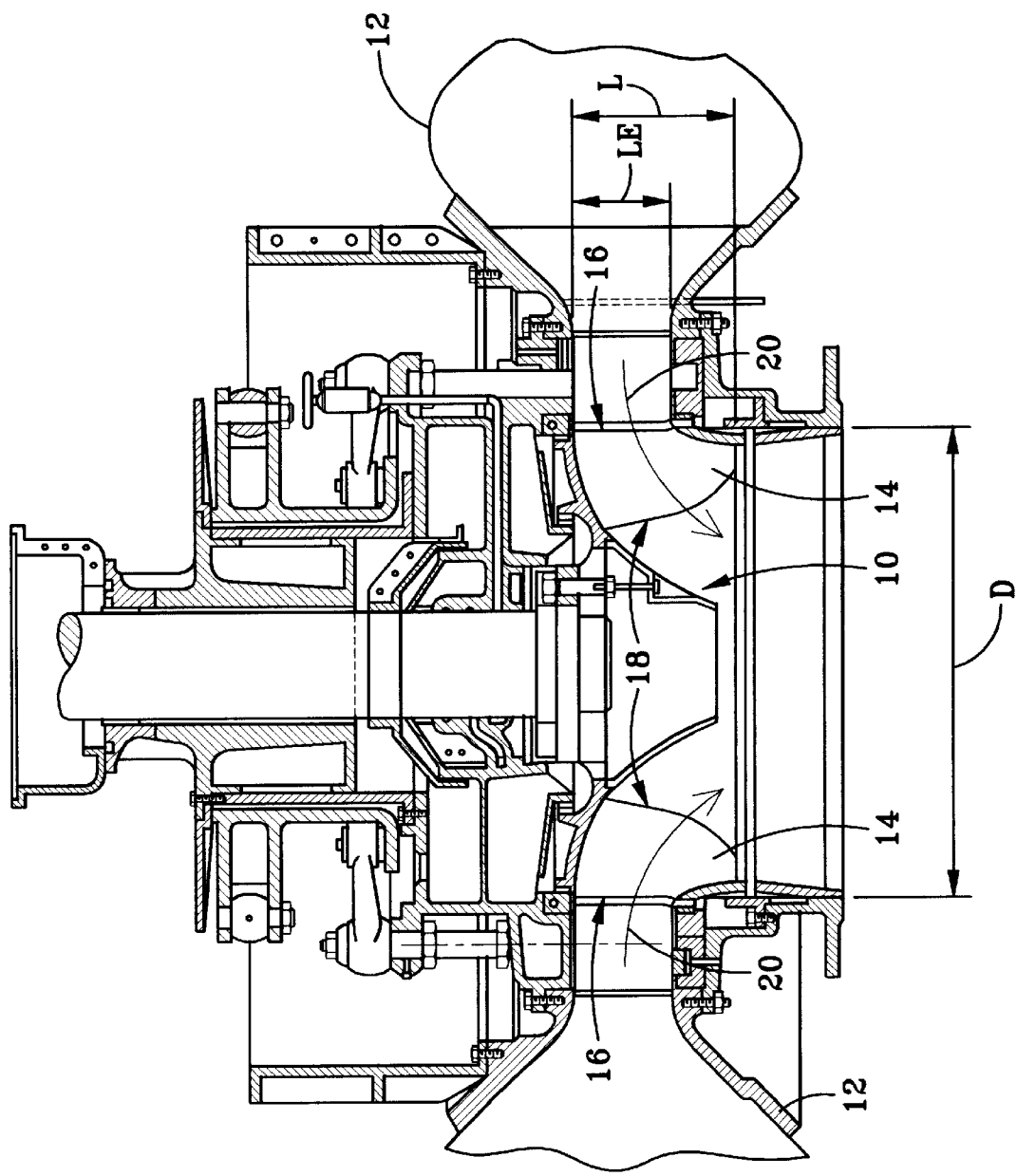
FIG. 1 is an axial sectional view of a conventional Francis turbine.
Figure 2:
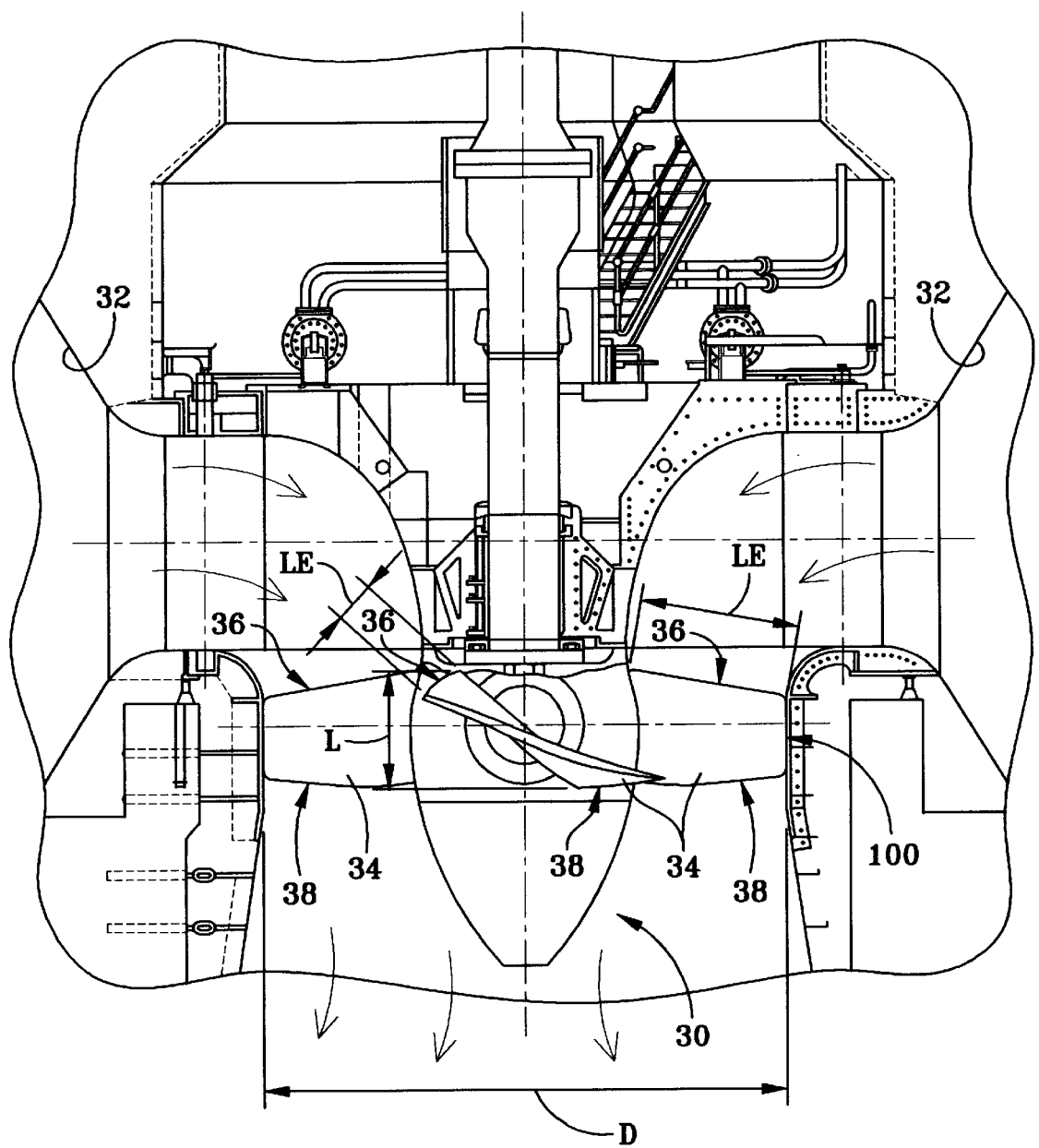
FIG. 2 is an axial sectional view of a conventional Kaplan turbine.
Figure 3:
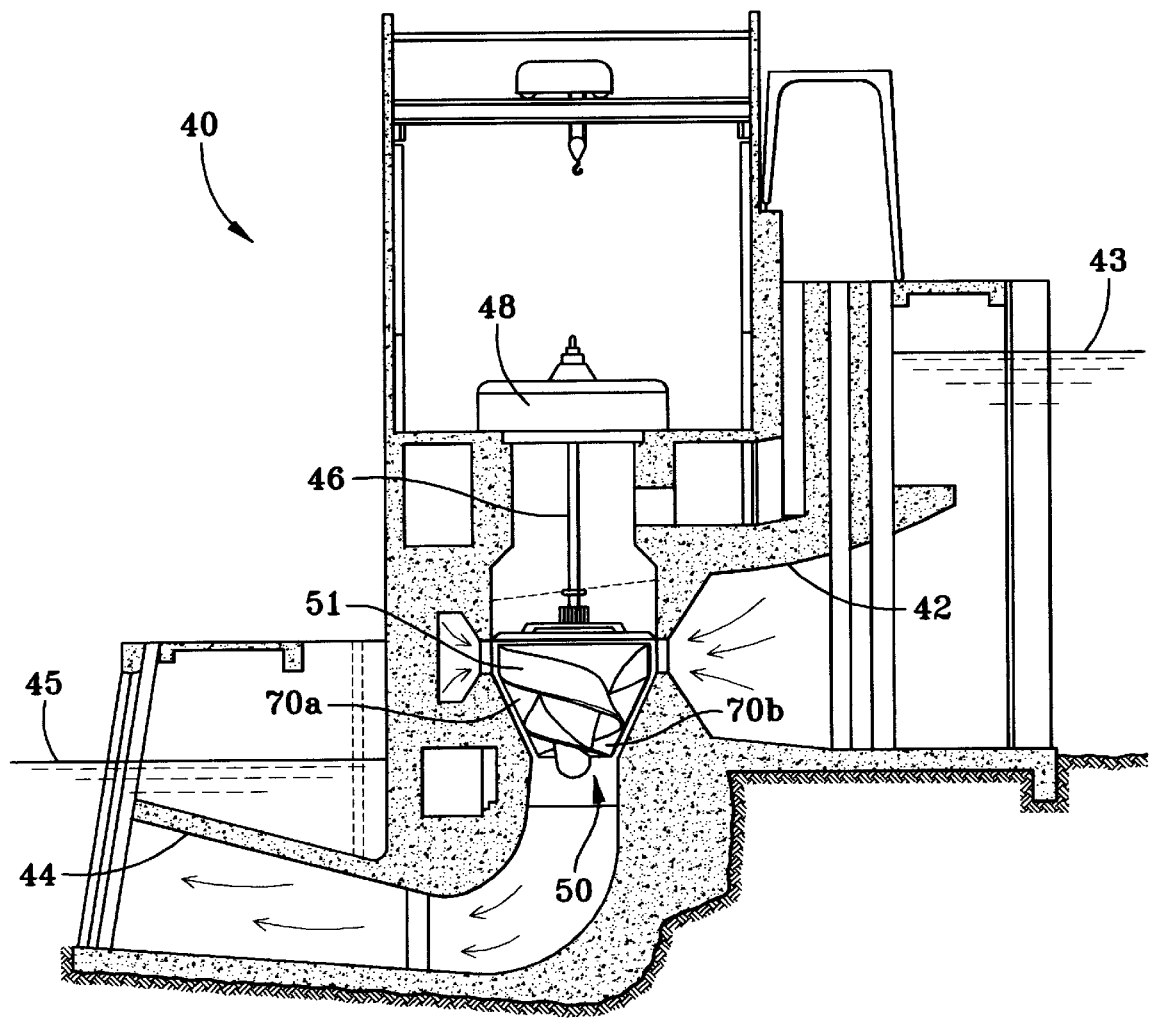
FIG. 3 is a schematic representation, partially in cross section, of a river power house that includes a turbine in accordance with a preferred embodiment of the present invention.

Now turning to the Figures, wherein like parts are referred to by the same number in all the drawing Figures, FIGS. 3–7b disclose a preferred embodiment of the turbine runner disclosed here. FIG. 3 schematically illustrates a river power house 40 that includes hydraulic turbine 50 and turbine runner 51 of the present invention. For purposes of clarity, as the description proceeds, the terms "turbine runner" and "turbine wheel" shall mean item 51, and the terms "turbine" or "hydraulic turbine" shall refer to item 50. Additionally, the term "water" shall mean water generally and also water that includes entrained matter such as fish.

In the preferred embodiments discussed here, the orientation of the turbine runner is substantially vertical, that is, the longitudinal axis 52 of the runner hub is substantially vertical. This is in accordance with conventional and typical turbine system installations. It will be recognized by those skilled in the art, however, that alternative orientations of the turbine wheel are optional and may be well-suited to particular turbine system installations. For example, the turbine runner may be oriented substantially horizontal.

The river power house has an intake channel 42 whereby upstream river water 43 flows to the turbine runner 51, and a draft tube 44 whereby the river water is discharged from the turbine runner to the downstream river water 45. The draft tube 44 shown in FIG. 3 serves to slow the flow of water downstream to river water 45, the tailwater, and as a result, a portion of the dynamic fluid pressure is recovered as static pressure. The draft tube is shown to include a bend, however it should be understood that optionally, the draft tube may also be configured without such a bend. It is believed that by installing the hydraulic turbine runner 51 in river power houses, fish mortality rates will be lower than fish mortality rates typically associated with conventional turbine runners, such as turbine runners 10 and 30 described above.

In river power house 40 the turbine runner 51 is fixed to one end of a rotatable shaft 46 and the opposite end of the shaft is connected to a generator means 48.

FIGS. 4–7b show in greater detail the hydraulic turbine runner 51 of the present invention that is expected to significantly reduce fish mortality as fish travel through river power houses.

Unitary hydraulic turbine runner 51 is rotatable about axis 52 during operation, and includes disk-shaped base 54, substantially conical hub 56 perpendicular to the base and oriented along axis 52, and first and second corkscrew turbine blades 58 and 60. The corkscrew turbine blades of the preferred embodiment shown in the drawing Figures are seen to be generally helically wrapped around hub 56 with an overall diameter (measured in a plane perpendicular to axis 52) which diminishes from the inlet toward the outlet. The corkscrew blades define generally spiral fluid flowpaths. The hub terminates in a semi-spherical or truncated elliptical end 57. The first and second turbine blades are arranged in a double helix around axis 52, of hub 56. The respective leading blade edges 62a and 62b are located 180 degrees apart, adjacent base 54. The trailing blade edges 64a and 64b also are located 180 degrees apart, adjacent the hub free end 57. See FIGS. 4 and 5. The turbine runner may be made from any suitable material, including, but not limited to bronze, steel and stainless steel, and may be formed by any suitable manufacturing process including any suitable casting and machining process for example.

Figure 4:
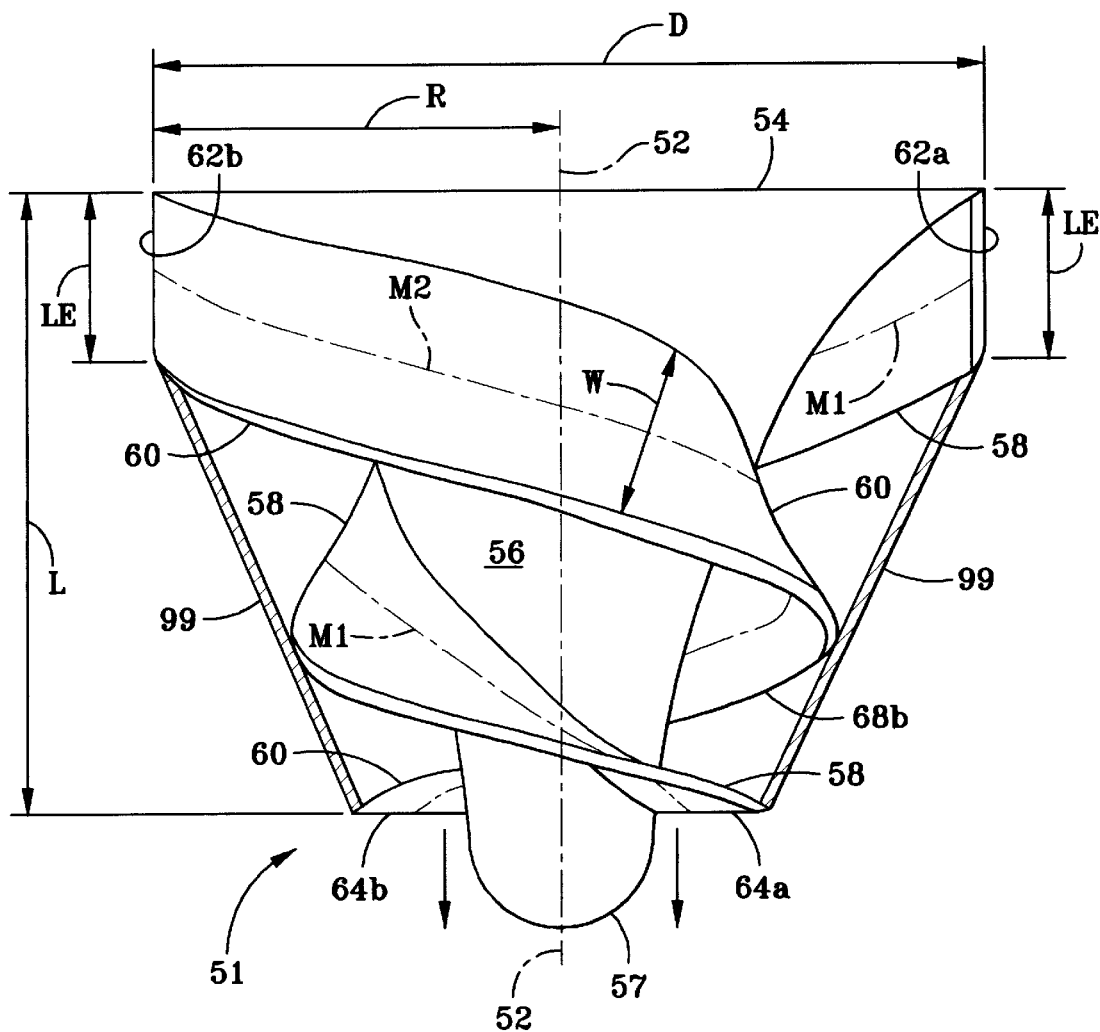
FIG. 4 is an enlarged elevational view of the turbine runner shown in FIG. 3.

The two turbine blades of turbine runner 51 are substantially the same, each blade having a certain blade running length and wrap angle dimension. Each turbine blade 58, 60 has a blade running length that is measured along an associated median curve identified as M1 for blade 58 and identified as M2 for blade 60. Different reference characters M1 and M2 are used to identify the spiral median curves for purposes of visual clarity. As shown in FIG. 4 in dashed font, each median curve is located along the respective blade midway between the hub 56 and shroud 99 in the main direction of fluid flow.

Figure 6:
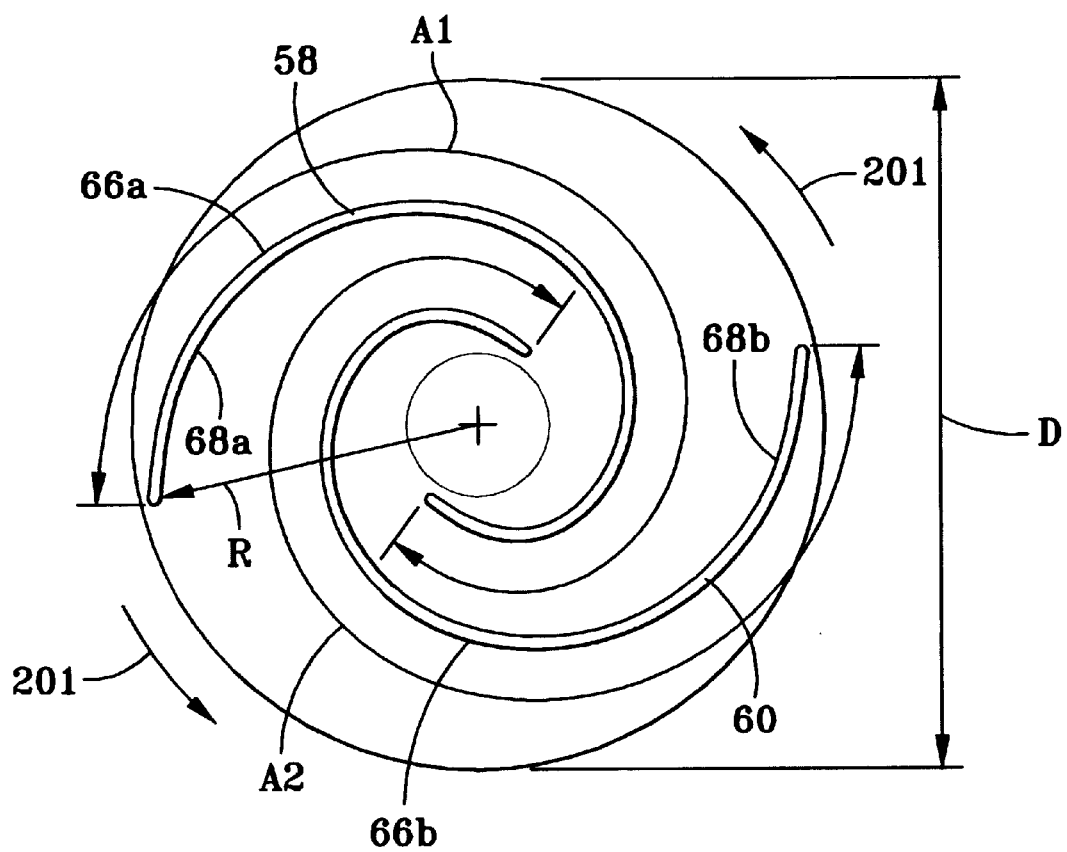
FIG. 6 is a view from the bottom of the turbine runner of FIG. 4 illustrating the blade wrap by utilizing the curves defined at the intersection of the base of the blades with the turbine runner hub.

The wrap angle of the blades around axis 52 is illustrated in FIG. 6. The wrap angle of the blades is defined as the number of degrees it extends circumferentially from its leading edge to its trailing edge. The wrap angle is identified in FIG. 6 as A1 for blade 58 and A2 for blade 60. In the illustrated preferred embodiment of the invention, the wrap angle or A1 and A2, of the blades may be between 180 and 450 degrees, or preferably between 270 and 450 degrees, and most preferably is 325 degrees. If the turbine runner includes three blades, the wrap angle for each blade preferably is between about 180 and 360 degrees.

Each blade has a width, W, perpendicular to the flow direction, measured halfway around the wrap angle. The width W is shown in FIG. 4. Unless clearly stated otherwise, as the description proceeds, the term "width" shall mean the blade width W shown in FIG. 4.

As also shown in FIG. 4, the turbine runner 51 has an axial length, L, and a maximum runner diameter, D. The terms "runner diameter" or "maximum runner diameter", unless clearly stated otherwise shall mean the maximum diameter of the turbine runner, and in the preferred embodiment turbine runner is the diameter at the inlet of the runner. The maximum runner diameter D is defined as two times the distance from the axis of rotation 52 of the turbine runner to the outermost portion of the leading blade edges 62a, 62b of the turbine blades 58 and 60. The radius is shown in FIG. 4 and is identified as R. The axial length L is defined as the distance between the uppermost part of the blade leading edges 62a, 62b and the lowermost tip of the trailing edges 64a, 64b.

In preferred embodiment of the turbine runner, the corkscrew blades have one or more of the following physical attributes and dimensional relationships: the ratio of the running length of each blade 58, 60 as defined by the respective median curve M1 or M2 (shown in FIG. 4) to the runner diameter D is equal to about 1.8 (M1/D or M2/D=1.8) but in all instances should be greater than 1.0, and the ratio of the running length of each blade (M1, M2) to the width W, of each blade measured halfway around the wrap angle of the blade, as noted above, is equal to about 9 (M1/W or M2/W=9) and in all instances should be greater than 3.0.

In turbine runner 51, it is preferred that the ratio of L/D, known to those skilled in the art as the aspect ratio, be greater than 0.6, is preferably between 0.6 and 1.0, and more preferably is about 0.75. Such L/D ratio of preferred embodiments of runner 51 is significantly larger than aspect ratios of conventional turbine runners. By extending the axial dimension, L, relative to the runner diameter, D, the distance between the leading edge of the blades and the trailing edge of the blades is greater, allowing the pressure to be decreased over a longer distance and time, thereby reducing fish mortality which would otherwise result from rapid pressure decreases within the flow through the turbine runner.

The specific performance characteristics of a turbine runner in accordance with the invention disclosed here, and hence the performance characteristics of a turbine in accordance with the present invention incorporating such turbine runner, will depend in large measure on the hydraulic conditions of the application in which they are employed. For purposes of the preferred embodiment discussed here, the hydraulic conditions or "design point" for which the turbine runner 51 is designed are the following: head— approximately 85 ft.; flow—approximately 1000 cubic ft. per second; and setting—turbine runner trailing edge elevation approximately at tailwater elevation. Using a turbine runner designed for these hydraulic conditions under different but similar conditions will yield different but correspondingly advantageous results. Likewise, using an alternative embodiment of the invention designed for different hydraulic conditions (for example, different head, flow, etc.), following the design principles disclosed here, will yield correspondingly advantageous results for such different hydraulic conditions. Again, making the assumption that hydraulic conditions are as called out above, blades 58 and 60 of the embodiment illustrated in the drawings are means for maintaining at subsequently all points within the main flow through the runner the minimum absolute pressure at not less than about 4 to 5 psia, more preferably not less than about 8 psia, achieving at substantially all points within the main flow through the runner a rate of pressure change that is less than about 80 psi/sec; achieving at subsequently all points within the main flow through the runner a velocity change across any shear zone not greater than about 15 ft/sec per inch; increasing the flow passage size through the runner; and reducing the total length and number of blade leading edges.

In preferred embodiments disclosed here, a rate of pressure change of less than 80 psi/sec is achieved at substantially all points within the main flow through the runner. There are discrete high rate of pressure change zones proximate the leading and trailing edges where the rate of pressure change is not within the desired rate. These zones are shown in FIGS. 7a and 7b.

Figure 7A:
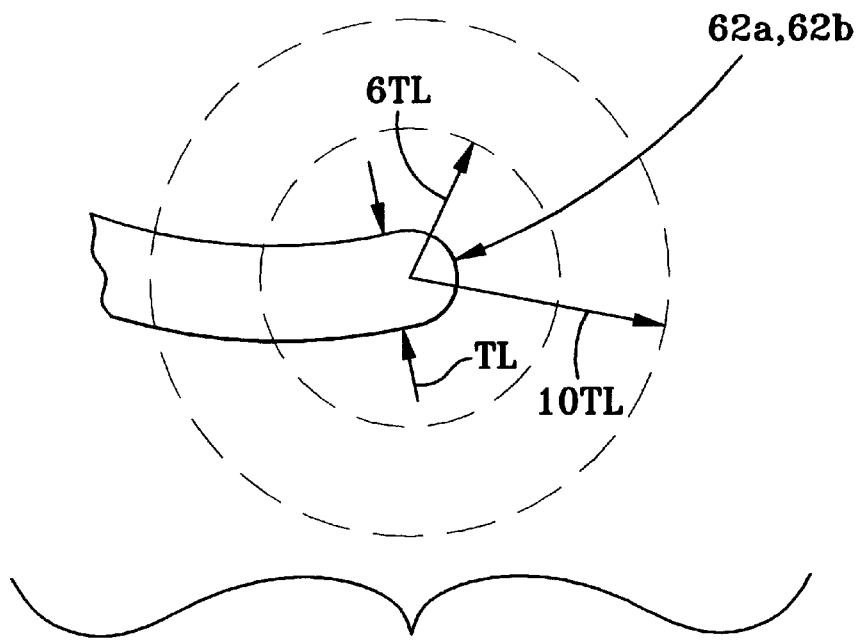
FIG. 7a is an enlarged view of the leading blade edge of the runner of FIG. 4, with a leading blade edge zone of high rate of pressure change identified.
Figure 7B:
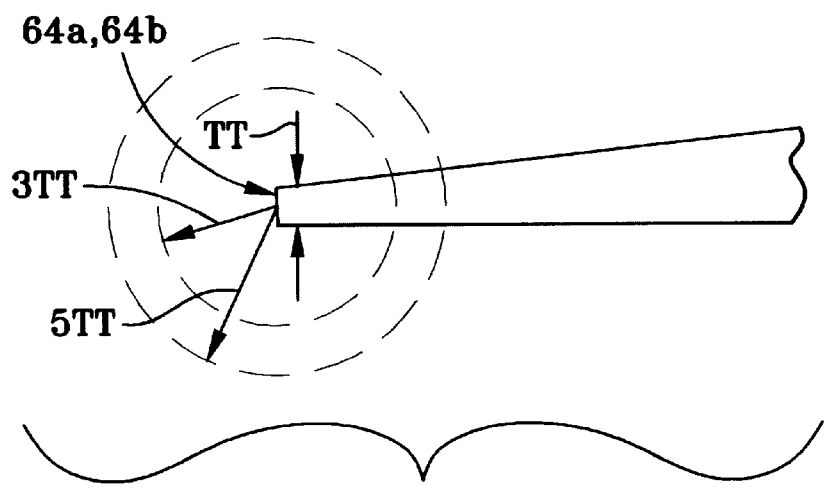
FIG. 7b is an enlarged view of the trailing blade edge of the runner of FIG. 4, with a trailing blade edge zone of high rate of pressure change identified.

FIG. 7a illustrates the high rate of pressure change zones at the leading edges 62a and 62b; and FIG. 7b illustrates the high rate of pressure change zones at the trailing edges 64a and 64b, such high rate of pressure change zones are referred to here individually or collectively in some instances as an "edge zone" or as "edge zones". Turning to FIG. 7a, each leading edge has a thickness, TL, and it has been determined that at substantially all points along the flow at least 6TL from the leading edge 62a, 62b, the rate of pressure change is advantageously less than 80 psi/sec, and at substantially all points along the flow at least 10TL from the leading edge, the rate of pressure change is less than 40 psi/sec. In the preferred embodiment the edge zone is preferably less than 10TL and more preferably is less than 6TL.

Turning to FIG. 7b, each trailing edge has a thickness TT, and it has been determined that at substantially all points along the flow at least 3TT from the trailing edge, the rate of pressure change advantageously is less than 80 psi/sec and at substantially all points along the flow is at least 5TT from the trailing edge, the rate of pressure change is less than 40 psi/sec. Therefore, during operation of turbine runner 51, the rate of pressure change outside the two smaller defined edge zones of high rate of pressure change in the FIGS. 7a and 7b is below 80 psi/sec, and outside the two larger defined zones of high rate of pressure change the rate of pressure change is below 40 psi/sec.

As indicated by flow lines in FIG. 3, the fluid enters the scroll case or other suitable plenum, flows substantially uniformly inward around the runner circumference and is discharged from the turbine runner into the draft tube substantially axially. The turbine runner 51 is a mixed flow member, since water enters the runner flow channel circumferentially, actually having axial, radial and circumferential components at the inlet. As the flow progresses through the runner, its axial component increases and it leaves the runner substantially axially. That is, as the water travels through the passageways, the gradually changing pitch of the blades and orientation of the hub gradually changes the flow direction of the fluid to axial.

As shown in FIG. 6, each blade 58 and 60 extends circumferentially more than 180 degrees about axis 52 from leading edges 62a, 62b to trailing edge 64a, 64b, respectively. As shown most clearly in FIG. 4, the leading edges 62a, 62b of the blades are oriented substantially parallel to axis 52 and trailing edges 64a, 64b are oriented substantially perpendicular to axis 52. Each leading edge has a leading edge length identified as LE in FIG. 4 The blades gradually transition from the substantially vertical leading edge to the substantially horizontal trailing edge along the length of the blades as the blades wrap around the axis 52. Although two helical blades are shown and described, it is contemplated that three or more helical blades may also be provided along the hub.

Figure 5:
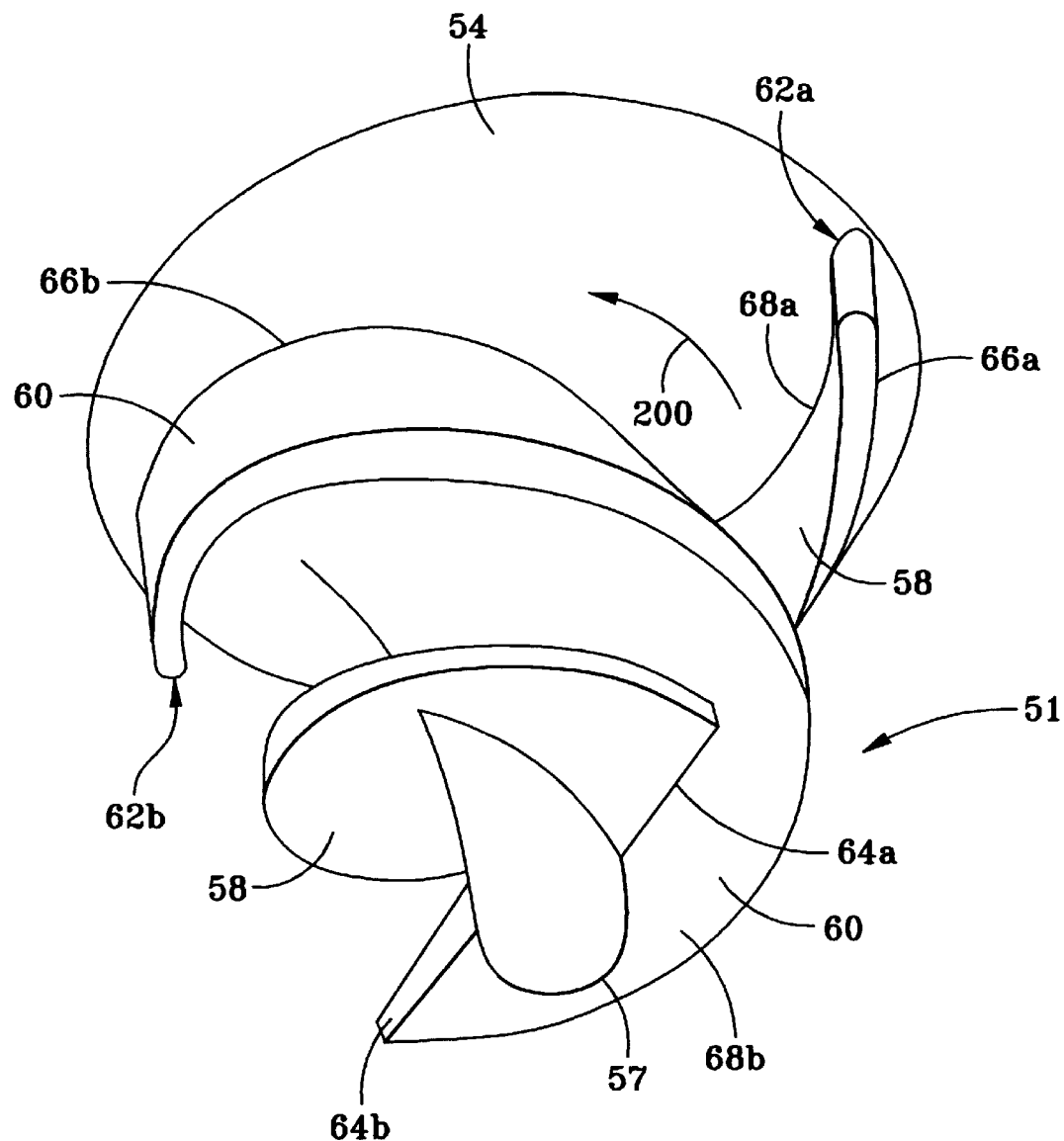
FIG. 5 is a perspective view of the turbine runner of FIG. 4.

As shown in FIG. 5 the blades spiral around the axis 52 from the leading edge to the trailing edge. The blades 58 and 60 each includes a convex side 66a, 66b and a concave side 68a and 68b, respectively. The convex and concave sides are most clearly illustrated in FIGS. 5 and 6. In the turbine runners disclosed here, and employed in the manner shown in FIG. 3, the convex side of each of the blades is the high pressure side of the blade. Thus the high pressure side is curved convexly and the high pressure side faces away from the direction of rotation of the turbine runner 51. During operation, the turbine runner 51 rotates about axis 52 counterclockwise in the direction of directional arrows 200, 201 shown in FIGS. 5 and 6. However, in alternative embodiments the turbine runner blades may be oriented as a mirror image of turbine runner 51 and in such an embodiment, the mirror image runner would be rotated clockwise about axis 52. In such an embodiment, the high pressure side or convex side would again face away from the direction of rotation. Thus the curvature of the blades may be reversed to thereby reverse the direction of rotation of turbine runner 51.

The sum of the length of the leading edges 62a, 62b is less than the maximum runner diameter D ($\Sigma$LE/D<1.0). In the preferred embodiment, the sum of the lengths of the leading edges is less than 40% of the maximum diameter D of runner 51. By decreasing the total leading edge length, fish are less likely to come in contact with a leading edge as they pass through the turbine runner 51 making mortality due to strike less likely.

Shroud 99 substantially encloses turbine runner 51. The shroud is attached to helical blades 58 and 60 at the lower part of the leading edges 62a and 62b at the radially outermost part of the blades along the substantially entire length of the helixes between the leading and trailing edges. See FIGS. 3 and 4. The shroud is attached to the blades by a weld connection or other suitable connection means. In this way, the blades and shroud rotate together during operation.

Referring to FIG. 3, the shroud, helical blades and hub define flow channels 70a and 70b, for water to travel through. The defined flow. channels or conduits are thus shaped generally helically.

By attaching the shroud to the turbine runner 51, the gap or clearance between the rotating turbine blades and stationary housing is eliminated, thereby decreasing the potential for trauma resulting from contact, abrasion, and grinding of the fish between the turbine and the stationary turbine housing. Rather than being caught and damaged between the turbine runner and stationary housing, the fish travel through the helical flow channels and are not exposed to clearances between moving and stationary parts.

The blade shape and configuration produces an acceptable rate of pressure change along the axial length of the runner. Additionally, the velocity gradient perpendicular to the flow outside the boundary layer at solid surfaces is also maintained at an acceptable level.

Also, in preferred embodiments disclosed here, a minimum absolute pressure of not less than 4–5 psia is maintained at substantially all points within the main flow through the runner, more preferably not less than about 8 psia, thus reducing fish injury due to pressure reduction and substantially eliminating cavitation and its detrimental effects. The stated minimum absolute pressures are based on setting the turbine runner's trailing edges at the tailwater elevation. Lower minimum pressures will result if the runner exit is above the tailwater level, in which case the stated values in psia will be lower by the distance in feet that the runner exit is above the tailwater multiplied by 0.43. Higher minimum pressures will result if the runner exit is below the tailwater level, in which case the stated values in psia will be higher by the distance in feet that the runner exit is below the tailwater level multiplied by 0.43. The term "main flow" is the entire flow channel less the relatively small edge zones at the leading and trailing blade edges.

The cross-sectional area available for the main flow at any point through the runner flow channels is relatively large, compared to, for example, the square of the width, W across a blade perpendicular to its edges at the hub and shroud, as shown in FIG. 4. This cross-sectional area refers to the plane which is essentially perpendicular to the blades between the hub and shroud. Maintaining a large cross-sectional area for the main flow reduces flow velocities and the probability of fish contacting any surface of the runner or shroud, thus reducing fish injury.

Thus in the preferred embodiments discussed here, the number of blades, the blade shape and orientation, and the rotating shroud yield the system operating characteristics and parameters which reduce the mortality rate of the fish.

It has been determined that the turbine runner 51 described herein in the application illustrated in FIG. 3 for the flow and head conditions recited above, at its best efficiency point, runner 5: is more than 80% efficient, and achieves a minimum absolute pressure nowhere less than 4 psi; and is more than 80% efficient and achieves a rate of pressure change of less than 80 psi/sec along substantially the entire length of the blades for installations similar to the design point referred to above. "Best efficiency point" shall mean for a given turbine runner, the most efficient point for extractingpower from fluid at certain flow parameters and conditions.

While a particular embodiments of this invention have been shown and described, it is not intended to limit the same to the details of the construction set forth, but instead, the invention embraces such changes, modifications and equivalents of the various parts and their relationships as come within the purview of the appended claims.

Having described the invention, we claim:

1. A hydraulic turbine comprising a turbine runner having at least two runner blades each having a corkscrew configuration, wherein the turbine runner is at least 80% efficient at its best efficiency point and achieves a rate of pressure change less than 80 psi/second at substantially all points along the main flow.

2. A hydraulic turbine comprising a turbine runner having at least two runner blades each having a corkscrew configuration, wherein each of the at least two runner blades has a leading edge and a trailing edge, and edge zones at the leading and trailing edges; and wherein the rate of pressure change along each runner blade is less than 80 psi/second between edge zones at its best efficiency point.

3. The hydraulic turbine as claimed in claim 2, wherein each of the at least two turbine runner blades has the leading edge with a leading edge thickness and a trailing edge with the trailing edge thickness, said edge zones being defined at each trailing edge by an area equal to three times the trailing edge thickness, and at each leading blade edge by an area equal to six times the leading edge thickness.

4. A hydraulic turbine comprising a turbine runner having at least two runner blades each having a corkscrew configuration, wherein the turbine runner is adapted for use in water having a tailwater elevation and wherein the turbine runner has a main fluid flow path defined at least in part by the at least two turbine runner blades having trailing edges at the tailwater elevation; and wherein the turbine runner is at least 80% efficient and the minimum absolute pressure maintained along the main fluid flow path within the runner is greater than 4 psia at its best efficiency point.

5. A turbine runner having at least two runner blades each having a corkscrew configuration, wherein each of the at least two runner blades has a leading edge and a trailing edge, and edge zones at the leading and trailing edges; and wherein the rate of pressure change along each runner blade is less than 80 psi/second between edge zones at the trailing edges and at the leading edges of each blade.

6. The turbine runner as claimed in claim 5 wherein each of the at least two turbine runner blades has a leading edge with a leading edge thickness and a trailing edge with a trailing edge thickness, said edge zones being defined at each trailing edge by an area having a dimension equal to three times the trailing edge thickness, and at each leading blade edges by an area having a dimension equal to six times the leading edge thickness.

7. A turbine runner having at least two runner blades each having a corkscrew configuration, the turbine runner being adapted for use in water having a tailwater elevation, wherein the turbine runner has a main fluid flow path defined by the at least two turbine runner blades, and wherein each of the at least two turbine runner blades has a trailing edge located at the tailwater elevation, and wherein the turbine runner is at least 80% efficient and the minimum absolute pressure maintained along the main fluid flow path within the runner is greater than 4 psia at its best efficiency point.

8. A turbine runner having at least two runner blades each having a corkscrew configuration, wherein the turbine runner is at least 80% efficient at its best efficiency point and achieves a rate of pressure change less than 80 psi/second at substantially all points along the main flow.

9. The turbine runner as claimed in claim 8 wherein each of the at least two runner blades has a leading edge and a trailing edge, and edge zones at the leading and trailing edges; and wherein the rate of pressure change along each runner blade is less than 80 psi/second between edge zones at each trailing edge and at each leading edge of each blade.

10. The hydraulic turbine runner as claimed in claim 9 wherein each of the at least two turbine runner blades has a leading edge with a leading edge thickness and a trailing edge with a trailing edge thickness, said edge zones at the trailing edge that terminate inward of the trailing edge at a distance three times the trailing edge thickness, and terminate inward of the leading edge at a distance equal to six times the leading edge thickness.

11. A turbine runner comprising a hub, the turbine runner having a runner diameter, and at least two runner blades along the hub, each of the at least two blades having a leading edge with a leading edge length; and wherein the ration of the sum of the leading edge lengths to the runner diameter is less than 1.0, wherein the turbine runner is at least 80% efficient at its best efficiency point, and achieves a rate of pressure change less than 80 psi/second at substantially all points in the main flow.

12. A turbine runner comprising a hub, the turbine runner having a runner diameter, and at least two runner blades along the hub, each of the at least two blades having a leading edge with a leading edge length; and wherein the ration of the sum of the leading edge lengths to the runner diameter is less than 1.0, wherein the turbine runner is adapted for use in water having a tailwater elevation, wherein the turbine runner has a main fluid flow path defined by the at least two turbine runner blades having trailing edges at the tailwater elevation, and wherein the turbine runner is at least 80% efficient and the minimum absolute pressure maintained along the main fluid flow path within the runner is greater than 4 psia at its best efficiency point.

13. A turbine runner comprising at least two runner blades, the turbine runner having a runner diameter, an axial length, and a hub, the at least two runner blades being located along said hub, wherein the aspect ratio of the axial length to the runner diameter is greater than approximately 0.6, and wherein the turbine runner is at least 80% efficient at its best efficiency point and achieves a rate of pressure change less than 80 psi/second at substantially all points along the main flow.

14. A turbine runner comprising at least two runner blades, the turbine runner having a runner diameter, an axial length, and a hub, the at least two runner blades being located along said hub, wherein the aspect ratio of the axial length to the runner diameter is greater than approximately 0.6, and wherein the turbine runner is adapted for use in water having an associated tailwater elevation, wherein the turbine runner has a main fluid flow path defined by the at least two turbine runner blades each having trailing edges located at the tailwater elevation, and wherein the turbine runner is at least 80% efficient and the minimum absolute pressure maintained along the main fluid flow path within the runner is greater than 4 psia at its best efficiency point.

15. A turbine runner comprising: a hub; and means for producing a turbine runner efficiency of at least 80% at its best efficiency point and a rate of pressure change less than 80 psi/second at substantially all points along said means, said means being located along said hub.

16. The turbine runner as claimed in claim 15 wherein said means is comprised of at least two runner blades, each of the at least two runner blades having a leading edge and a trailing edge, and edge zones at the leading and trailing edges; and wherein the rate of pressure change along each runner blade is less than 80 psi/second between the edge zones at the trailing edges and at the leading edges of each blade.

17. The turbine runner as claimed in claim 16 wherein each of the at least two turbine runner blades has a leading edge with a leading edge thickness and a trailing edge with a trailing edge thickness, said edge zones being defined at the trailing edge by an area having a radius equal to three times the trailing edge thickness, and at the leading blade edges by an area having a radius equal to six times the leading edge thickness.

18. The turbine runner as claimed in claim 16 wherein the turbine runner is adapted to be used in a fluid having a discharge fluid elevation, the turbine runner having a main fluid flow path, and said trailing edges being located at the discharge fluid elevation, and wherein the minimum absolute pressure maintained along the main fluid flow path within the runner is greater than 4 psia at its best efficiency point.

19. The turbine runner as claimed in claim 16 wherein the at least two runner blades each have a corkscrew configuration.

20. The turbine runner as claimed in claim 15 wherein the turbine runner includes an axis, an inlet and an outlet; flow through the inlet being mixed flow; and flow through the outlet being substantially axial.

21. The turbine runner as claimed in claim 16 wherein the turbine runner has fewer than four leading blade edges.

22. The turbine runner as claimed in claim 16 wherein the turbine runner has a runner diameter; and wherein the ratio of the sum of the leading edge lengths to the runner diameter is less than 1.0.

23. The turbine runner as claimed in claim 22 wherein the ratio of the sum of the leading edge lengths to the runner diameter is between 0.3 and 0.7.

24. The turbine runner as claimed in claim 22 wherein the ratio of the sum of the leading edge lengths to the runner diameter is between 0.4 and 0.6.

25. The turbine runner as claimed in claim 16 wherein the turbine runner has a runner diameter, each of the at least two runner blades having a blade running length; and wherein the ratio of each blade running length to the runner diameter is greater than 1.0.

26. The turbine runner as claimed in claim 16 wherein the turbine runner has a runner diameter, each of the at least two runner blades having a blade running length and a blade width; and wherein the ratio of each blade running length to the blade width is greater than 3.0.

27. The turbine runner as claimed in claim 21 wherein the turbine runner has two leading blade edges.

28. The turbine runner as claimed in claim 15 wherein the turbine runner has a runner diameter, and an axial length; and wherein the aspect ratio of the axial length to the runner diameter is greater than 0.6.

29. The turbine runner as claimed in claim 16 wherein the turbine runner has an axis of rotation; and two turbine runner blades, each turbine blade having a wrap angle around the axis of rotation between the leading and trailing edges, each wrap angle being equal to a value between 180 and 450 degrees.

30. A turbine runner for passing a fluid, the fluid having a fluid discharge elevation, the turbine runner comprising: a hub, the turbine runner having a runner diameter, an axial length, a longitudinal axis, an inlet, an outlet, at least two turbine runner blades along said hub in a corkscrew configuration, each of said at least two blades comprising a leading edge, a trailing edge located at the discharge fluid elevation, a blade length, a blade width; the fluid flow at the inlet being mixed flow; and fluid flow at the outlet being substantially axial; and wherein:
A) the ratio of the sum of the leading edge lengths to the runner diameter is less than 1.0;
B) the ratio of each blade running length to the runner diameter is greater than 1.0;
C) the ratio of each blade running length to the respective blade width is greater than 3.0;
D) the aspect ratio of the axial length to the runner diameter is greater than 0.6; and
E) the turbine runner is at least 80% efficient and achieves a rate of pressure change less than 80 psi/second along substantially the length of the at least two runner blades and the minimum absolute pressure maintained along the main fluid flow path within the runner is greater than 4 psia at its best efficiency point.

31. The turbine runner as claimed in claim 30 wherein the ratio of the sum of the leading edge lengths to the runner diameter is between 0.3 and 0.7.

32. The turbine runner as claimed in claim 30 wherein the ratio of the sum of the leading edge lengths to the runner diameter is between 0.4 and 0.6.

33. The turbine runner as claimed in claim 30 wherein the turbine runner has fewer than four leading blade edges.

34. The turbine runner as claimed in claim 33 wherein the turbine runner has two leading blade edges.

35. The turbine runner as claimed in claim 30 wherein each of the at least two runner blades has a leading edge and a trailing edge, and edge zones at the leading and trailing edges; and wherein the rate of pressure change along each runner blade is less than 80 psi/second between edge zones at the trailing edge and at the leading edge of each blade.

36. The hydraulic turbine as claimed in claim 35 wherein each of the at least two turbine runner blades has a leading edge thickness and a trailing edge thickness, said edge zones being defined at the trailing edge by an area having a radius equal to three times the trailing edge thickness, and at the leading blade edges by an area having a radius equal to six times the leading edge thickness.

37. An hydraulic turbine including a turbine runner, the turbine runner comprising:
a circumferential inlet for receiving a fluid and an axial outlet for discharging the fluid;
a conical-shaped hub rotatable about a central axis and having a diameter that decreases in size from the inlet to the outlet, the conical-shaped hub including a base having a circumference adjacent the inlet and a surface sloping inwardly toward the central axis, the surface including a concave section facing the inlet when viewed in the meridional cross-section;
at least two helical turbine blades connected to said conical-shaped hub, each said turbine blade having a leading edge adjacent to the inlet, a trailing edge adjacent to the outlet, a blade running length therebetween having a pitch, each said turbine blade further including an outer edge, wherein each said turbine blade winds at least halfway around said conical-shaped hub; and
a shroud surface surrounding the rotatable hub, the shroud surface being defined by the outer edges of the turbine blades, the shroud surface and the hub defining a flow channel for the fluid between the inlet and the outlet,
wherein the circumferential inlet completely surrounds the base of the hub and is adapted for receiving a fluid flow around the circumference of the inlet that is uniform in quantity, direction and pressure, the fluid flow including a component perpendicular to the central axis when viewed in the meridional cross-section, and wherein both the hub surface and the shroud surface are non-parallel to the central axis at the inlet and parallel to the central axis at the outlet for changing the direction of the fluid passing through the turbine runner, the fluid being discharged at the outlet in a direction substantially parallel to the central axis.

38. The turbine as claimed in claim 37, wherein the turbine comprises a stationary housing adapted for receiving the rotatable turbine runner, the stationary housing including the shroud surface, and wherein the shroud surface and the outer edges of the turbine blades are separated by a clearance.

39. The turbine as claimed in claim 37, wherein the turbine runner includes a shroud having the shroud surface, the shroud being attached to the outer edges of the turbine blades.

40. The turbine as claimed in claim 37, wherein the hub surface and the shroud surface are substantially aligned with the fluid flow at the inlet when viewed in the meridional cross-section.

41. The turbine as claimed in claim 37, wherein the blade running length of each said blade includes a concave surface facing the central axis and a convex surface facing away from the central axis and toward the inlet when viewed in a section perpendicular to the central axis at the inlet.

42. The turbine as claimed in claim 37, wherein the turbine runner has less than five turbine blades.

43. The turbine as claimed in claim 37, wherein each said leading edge of each said turbine blade has a leading edge length; and wherein the ratio of the sum of the leading edge lengths to the diameter of the runner at the leading edges of the blades is less than 1.0.

44. The turbine as claimed in claim 43, wherein the ratio of the sum of the leading edge lengths to the diameter of the runner at the leading edges of the blades is between 0.3 and 0.7.

45. The turbine as claimed in claim 37, wherein the ratio of the blade running length of each said blade to the diameter of the runner at the leading edges of the blades is greater than 1.0.

46. The turbine as claimed in claim 45, wherein the ratio of the blade running length of each said blade to the diameter of the runner at the leading edges of the blades is approximately equal to 1.8.

47. The turbine as claimed in claim 37, wherein each said blade has a blade width, and wherein the ratio of the blade running length to the blade width is greater than 3.0.

48. The turbine as claimed in claim 46, wherein the ratio of the blade running length to the blade width is approximately equal to 9.

49. The turbine as claimed in claim 37, wherein the turbine runner has an axial length extending along the central axis, and wherein the aspect ratio of the axial length to the diameter of the hub at the leading edges of the blades is greater than 0.6.

50. The turbine as claimed in claim 49, wherein the aspect ratio of the axial length of the turbine runner to the diameter of the hub at the base thereof is between 0.6 and 1.0.

51. The turbine as claimed in claim 37, wherein the turbine blades are wrapped around the central axis, each said turbine blade having a wrap angle extending between the leading and trailing edges thereof; each said wrap angle being between 180 and 450 degrees.

52. The turbine as claimed in claim 37, wherein the shroud surface slopes inwardly toward the central axis between the inlet and the outlet.

53. The turbine as claimed in claim 37, wherein the shroud surface has a contour that is substantially similar to the contour of the hub surface.

54. A turbine runner for a hydraulic turbine comprising:
   a conical-shaped hub rotatable about a central axis having a first end and a second end remote therefrom, the conical-shaped hub including a base having a circumference at the first end thereof and a surface sloping inwardly toward the central axis, the conical-shaped hub having a diameter that decreases in size from the first end to the second end, wherein the sloping surface includes a concave section facing away from the central axis; and
   at least two helical turbine blades connected to said conical-shaped hub, each said turbine blade having a leading edge adjacent to the first end, a trailing edge adjacent to the second end, a blade running length therebetween having a pitch, each said turbine blade further including an outer edge, wherein each said turbine blade winds at least halfway around said conical-shaped hub,
   wherein the first end of the turbine runner is adapted for receiving a fluid completely around the circumference of the base that is uniform in quantity, direction and pressure, the fluid flow including a component perpendicular to the central axis, and wherein the sloping surface of the hub is parallel to the central axis adjacent the second end of the hub.

55. The turbine runner as claimed in claim 54, further comprising a shroud having a shroud surface attached to the outer edges of the turbine blades, wherein the shroud surface and the sloping surface of the hub define a flow channel for a fluid between the first and second ends of the turbine runner.

* * * * *

UNITED STATES PATENT AND TRADEMARK OFFICE
CERTIFICATE OF CORRECTION

PATENT NO. : 5,997,242
DATED : December 7, 1999
INVENTOR(S) : George E. Hecker and Willem Jansen It is certified that error appears in the above-identified patent and that said Letters Patent is hereby corrected as shown below:

Title page,
Item [60], Related U.S. Application Data, should be changed to
-- provisional application No. 60/054,863, Aug. 6, 1997 --.

Signed and Sealed this

Eighth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 5,997,242
DATED : December 7, 1999
INVENTOR(S) : George E. Hecker and Willem Jansen Page 1 of 1

It is certified that error appears in the above-identified patent and that said Letters Patent is hereby corrected as shown below:

Title page,
Item [60], Related U.S. Application Data, should be -- Provisional application No. 60/032,185, Dec. 2, 1996, provisional application No. 60/036,856, Jan. 31, 1997, and provisional application No. 60/054,863, Aug. 6, 1997 --.

Column 1,
Lines 3-5, should read -- This application claims benefit of Provisional Applns. 60/032,185 filed Dec. 2, 1996; 60/036,856 filed Jan. 31, 1997, and 60/054,863 filed Aug. 6, 1997. --.

Signed and Sealed this

Twenty-first Day of February, 2006

JON W. DUDAS
*Director of the United States Patent and Trademark Office*